(12) United States Patent
Latarche et al.

(10) Patent No.: US 7,461,085 B2
(45) Date of Patent: *Dec. 2, 2008

(54) APPARATUS AND METHOD FOR PARAMETRIC GROUP PROCESSING

(75) Inventors: Neil Latarche, San Jose, CA (US); John Wang, San Jose, CA (US)

(73) Assignee: Verity, Inc., Sunnyvale, CA (US)

( * ) Notice: Subject to any disclaimer, the term of this patent is extended or adjusted under 35 U.S.C. 154(b) by 279 days.

This patent is subject to a terminal disclaimer.

(21) Appl. No.: 11/286,233

(22) Filed: Nov. 23, 2005

(65) Prior Publication Data

US 2006/0074950 A1   Apr. 6, 2006

Related U.S. Application Data

(63) Continuation of application No. 09/851,640, filed on May 8, 2001, now Pat. No. 6,999,971.

(51) Int. Cl.
*G06F 17/30* (2006.01)
(52) U.S. Cl. .............................. 707/102; 707/1; 707/3; 707/4; 707/5; 707/104.1
(58) Field of Classification Search .............. 707/1–5, 707/104.1, 100–102
See application file for complete search history.

(56) References Cited

U.S. PATENT DOCUMENTS

| | | |
|---|---|---|
| 5,446,833 A | 8/1995 | Miller et al. |
| 5,563,806 A | 10/1996 | Barry et al. |
| 5,852,818 A * | 12/1998 | Guay et al. ..................... 707/1 |
| 5,966,704 A | 10/1999 | Furegati et al. |
| 6,052,693 A * | 4/2000 | Smith et al. .............. 707/104.1 |
| 6,101,491 A | 8/2000 | Woods |
| 6,253,188 B1 | 6/2001 | Witek et al. |
| 6,263,342 B1 * | 7/2001 | Chang et al. ............ 707/103 R |
| 6,449,627 B1 | 9/2002 | Baer et al. |
| 6,536,037 B1 | 3/2003 | Guheen et al. |
| 6,611,840 B1 * | 8/2003 | Baer et al. .................. 707/102 |
| 6,735,310 B1 * | 5/2004 | Hsing et al. ................... 380/28 |
| 6,865,576 B1 * | 3/2005 | Gong et al. ................. 707/100 |
| 2001/0044758 A1 | 11/2001 | Talib et al. |
| 2002/0103789 A1 | 8/2002 | Turnbull et al. |

* cited by examiner

*Primary Examiner*—Hung T Vy
*Assistant Examiner*—Hanh B Thai
(74) *Attorney, Agent, or Firm*—Cooley Godward Kronish LLP

(57) ABSTRACT

A method of parametric group processing includes forming a parametric index from an indexed database. A first parametric group and a second parametric group corresponding to elements in the parametric index are specified. The first parametric group and the second parametric group are merged to produce a merged parametric group. A parametric result is extracted from the merged parametric group, where the parametric result specifies a set of documents.

19 Claims, 6 Drawing Sheets

APPARATUS AND METHOD FOR PARAMETRIC GROUP PROCESSING

BRIEF DESCRIPTION OF THE INVENTION

This invention relates generally to techniques for identifying relevant documents stored within a computer environment. More particularly, this invention describes computerized techniques for parametric group processing to identify relevant documents within a computer environment.

BACKGROUND OF THE INVENTION

It is frequently necessary to navigate through a large inverted index of database items to identify a small number of entries that meet very specific criteria. For instance, a user searching a database of used cars may wish to quickly winnow a search down to a red Toyota costing no more than $10,000, manufactured in 1995 or later, located within fifty miles of San Francisco, and with a text description containing the words "excellent condition".

A text query such as "excellent condition" may be handled using standard methods in information retrieval. A query, such as, "red Toyota costing no more than $10,000, manufactured in 1995 or later, located within fifty miles of San Francisco" is known as a range query. Range queries are traditionally handled using one of two techniques. First, computational geometry may be used. Computational geometry is feasible provided that the attributes (e.g., price, age) are numerical values that can be ordered. Computational geometry is not available for non-orderable attributes, known as categorical attributes, such as color. A second approach to handling range queries is through a relational database. Relational databases provide the ability to answer a very rich set of queries, expressed in the Structured Query Language (SQL). In addition, relational databases provide transaction logging and recovery. This richness of functionality comes at the price of relatively slow execution speeds. To process a search, the parameters within the search query must be converted to an SQL statement. The SQL statement must then be applied to the database. While it is possible to articulate parametric queries as SQL statements, this approach is time consuming since parameters must be converted to SQL and then be applied to the database. In high-volume electronic commerce and marketplace applications, such as those commonly found on the Internet, it is not feasible to rely on a database to react in real time when hundreds of users are concurrently launching searches, each of which involves several fields or parameters.

In view of the foregoing, it would be highly desirable to provide improved techniques for processing search queries. More particularly, it would be highly desirable to provide an improved technique for processing queries, that include multiple fields or parameters.

SUMMARY OF THE INVENTION

The invention includes a method of forming a parametric index from an indexed database. A first parametric group and a second parametric group corresponding to elements in the parametric index are specified. The first parametric group and the second parametric group are merged to produce a merged parametric group. A parametric result is extracted from the merged parametric group, where the parametric result specifies a set of documents.

The invention also includes a method of performing a text search to produce text search results. The text search results are mapped into a parametric index to identify a first parametric group. The first parametric group is merged with a second parametric group to produce a merged parametric group. A parametric result is extracted from the merged parametric group, wherein the parametric result specifies a set of documents.

The invention also includes a computer readable medium with a parametric group harvester to specify a first parametric group and a second parametric group corresponding to elements in a parametric index. A parametric group combiner combines the first parametric group and the second parametric group to produce a merged parametric group. A parametric result generator extracts a parametric result from the merged parametric group, wherein the parametric result specifies a set of documents.

The invention allows parametric searches to be performed without the generation of SQL statements that need to be processed by a database. Consequently, sophisticated knowledge of the database architecture is not necessary. The parametric searches of the invention are relatively fast as they are directly processed in connection with a parametric index. Since the parametric index can be defined solely with fields and document identifications, it is relatively small. Therefore, the parametric index can be stored in primary memory, which facilitates rapid access and processing of the data within the parametric index. This stands in sharp contrast to the amount of time required to process database information stored in secondary memory. Another advantage of the invention is that it allows standard text search results to be incorporated into parametric searches.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
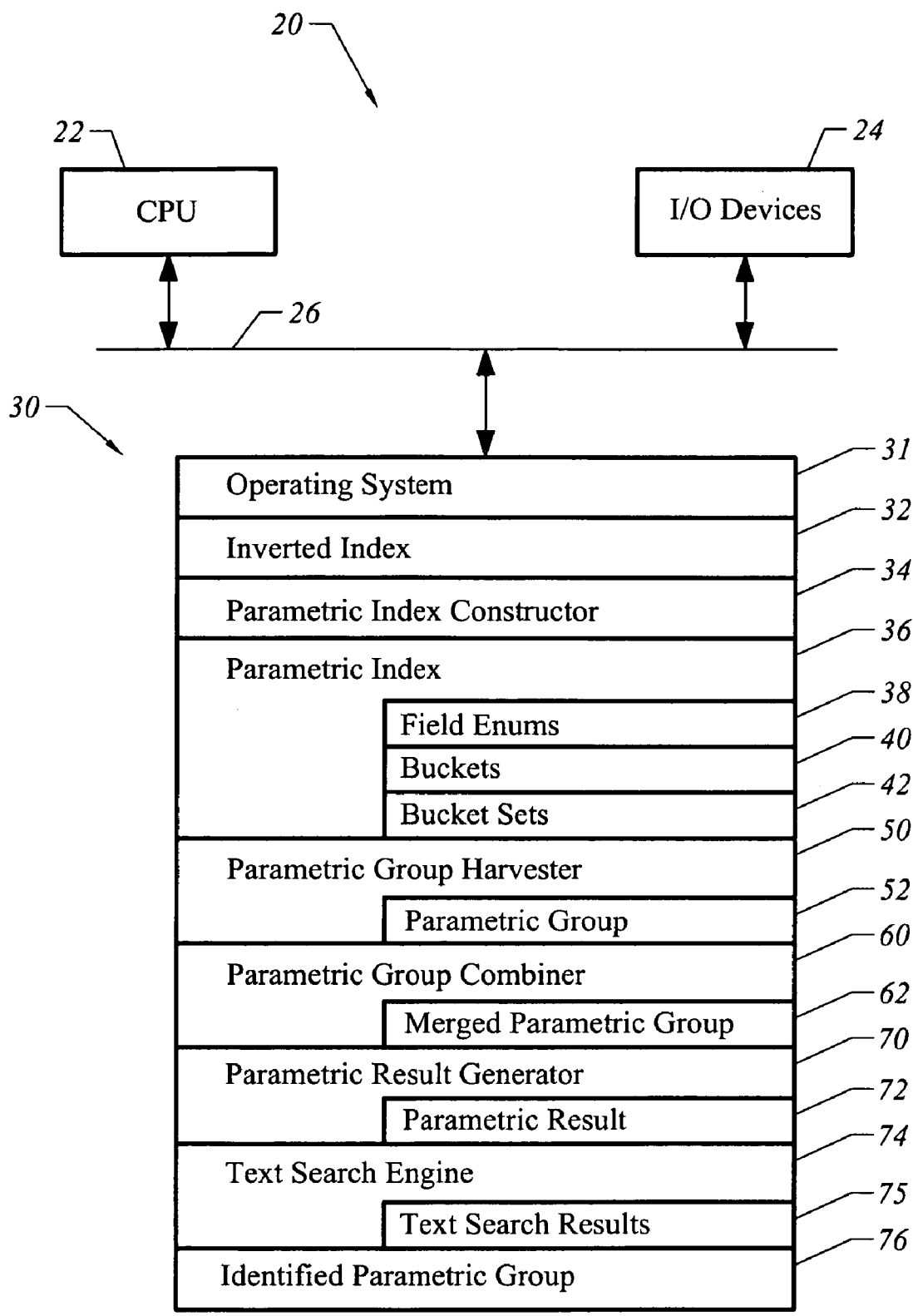
FIG. 1 illustrates an apparatus constructed in accordance with an embodiment of the invention.

FIG. 1 illustrates an apparatus 20 constructed in accordance with an embodiment of the invention. The apparatus 20 includes a central processing unit 22 connected to a set of input/output devices 24 via a system bus 26. The input/output devices 24 may include a keyboard, mouse, touch screen, video display, printer, and the like. Also attached to the system bus 26 is a memory 30, which may be primary and/or secondary memory. The memory 30 stores a number of executable programs, many of which are known in the art. For example, the memory 30 stores an operating system 31 and an inverted index 32. The operating system 31 may be any of a number of available operating systems. The inverted index 32 is a database indexed according to a predetermined schema.

The elements of FIG. 1 discussed up to this juncture are well known in the art. The present invention is directed toward the remaining executable modules stored in memory 30 that are used to implement techniques of the invention. In particular, the invention includes a parametric index constructor 34. The parametric index constructor 34 includes executable code to process the inverted index 32 to produce a parametric index 36. The parametric index is an arrangement of data from the inverted index that is organized according to qualitative parameters (i.e., categorical attributes). The parametric index includes fields and document identifications. Since the documents themselves do not have to be included in the parametric index, the parametric index can be relatively small, allowing it to be stored in primary memory. Storing the parametric index in primary memory facilitates rapid processing of parametric index information.

As discussed below, in one embodiment of the invention, the parametric index 36 is defined in relation to FieldEnum variables 38, bucket variables 40, and bucketset variables 42. The parametric index constructor 34 may utilize a batch command to produce the parametric index 36 from the inverted index 32.

Once the parametric index 36 is constructed, a query and/or sets of parametric groups may be processed in accordance with the invention. A parametric group harvester 50 is used to specify one or more parametric groups 52. The parametric group harvester 50 includes executable code to identify a parametric group within a query or other set of data. Alternately, the parametric group harvester 50 may be a graphical user interface, command line interface, or the like that can be used to specify a parametric group.

A parametric group combiner 60 is then used to merge different parametric groups. The parametric group combiner 60 includes executable code to merge a first parametric group with a second parametric group. As used herein, the term merge refers to any logical operation performed between two or more parametric groups. The different parametric groups may be existing parametric groups and/or one or more parametric groups generated from a text query. The parametric group combiner 60 produces a merged parametric group 62.

A parametric result generator 70 produces a parametric result 72 from the merged parametric group 62. The parametric result generator 70 includes executable code to produce a list of documents identified within a parametric group. That is, the parametric result generator 70 maps a parametric group (e.g., the merged parametric group) to a set of documents corresponding to the parametric group.

The parametric group harvester 50, parametric group combiner 60, and parametric group generator 70 may be written and operated independently, or their functions may be combined into a single executable module. For purposes of illustration it is useful to describe different functions of the invention in terms of different modules. However, this segmentation is arbitrary and therefore should not be viewed as limiting in any manner.

The executable code of the invention may be operated independently or it may be combined with a standard text search engine 74. A standard text search engine 74 produces text search results 75. The text search engine 74 seeks text string matches; it does not process range queries. In accordance with the invention, the resultant text search results 75 may be converted to a parametric group and subsequently combined with one or more identified parametric groups 76 to produce a merged parametric group 62, as discussed below.

Those skilled in the art will recognize a number of distinct features associated with the present invention. First, the invention executes parametric searches in connection with a parametric index 36. This stands in contrast to prior art techniques that arguably perform parametric searches using SQL statements and a database. The use of SQL statements and a database is a relatively slow approach that cannot match the processing efficiencies associated with the present invention's direct parametric search against a parametric index 36. That is, it is time consuming to generate an SQL statement and access a database stored in secondary memory. In addition, sophisticated knowledge of the database architecture and SQL is required in this prior art technique. In contrast, the present invention is relatively fast since SQL statements do not have to be formed and the parametric index is relatively small, so it can be stored in primary memory, allowing for rapid processing. Another feature of the invention is that text search results can be converted into a parametric group, facilitating subsequent parametric group processing.

The description of the apparatus of FIG. 1 has provided an overview of the invention. The invention is more fully appreciated with the following discussion, which is directed toward processing steps associated with the invention. The processing steps are discussed in connection with a specific example.

Figure 2:
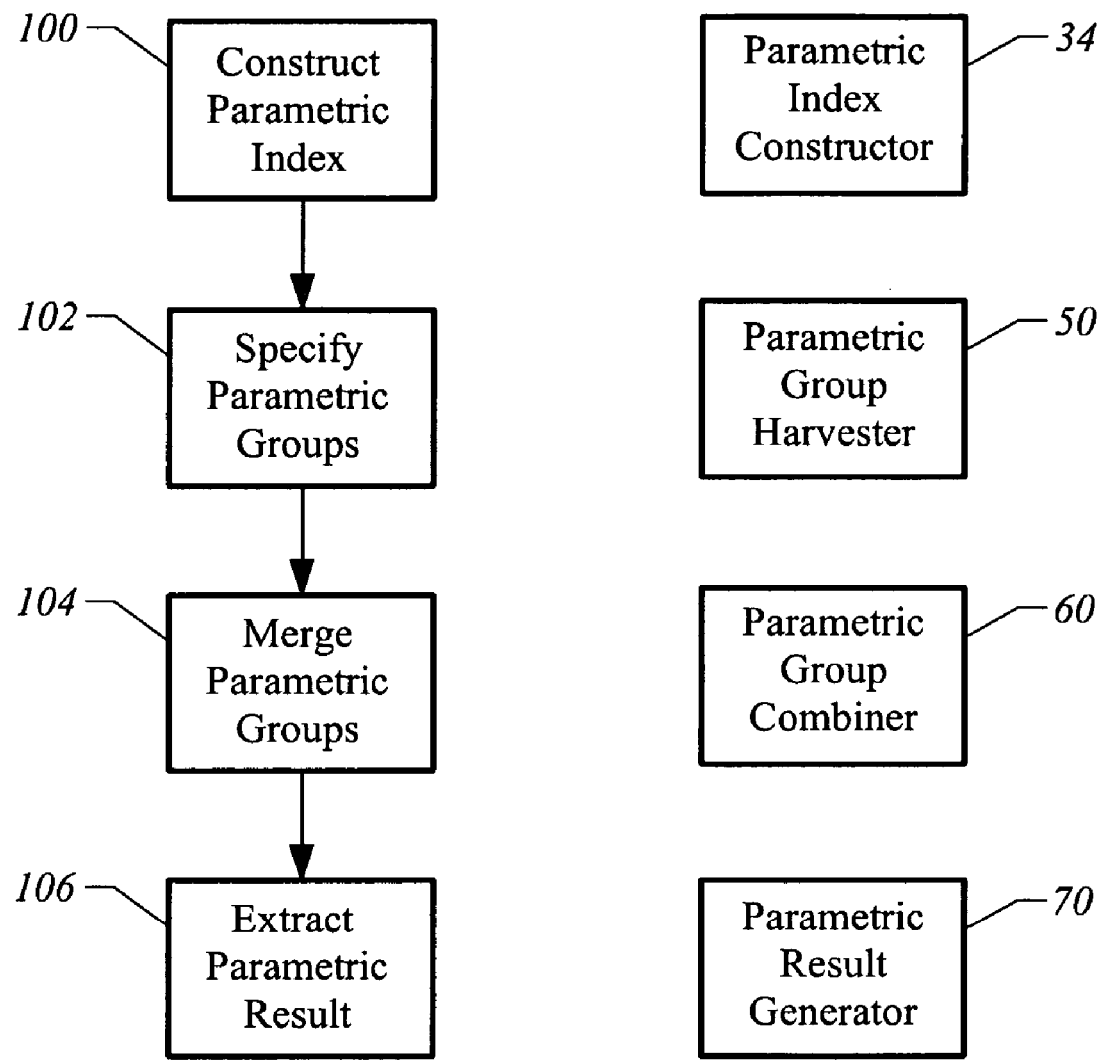
FIG. 2 illustrates processing steps performed in accordance with an embodiment of the invention.

FIG. 2 illustrates processing steps associated with an embodiment of the invention. The figure also illustrates the corresponding physical structure used to perform the processing operation. In this embodiment of the invention, the corresponding physical structures are in the form of executable computer code. The same operations may also be performed via hardwired circuits, firmware, programmable logic devices, discrete circuits, and the like. Furthermore, as previously indicated, the individual computer code modules may be combined and interleaved in any manner.

The first processing step shown in FIG. 2 is to construct a parametric index (step 100). As indicated in FIG. 2, this operation may be implemented with executable code in the form of a parametric index constructor 34. As previously indicated, the parametric index constructor 34 includes executable code to process the inverted index 32 to produce a parametric index 36. Consider an inverted index 32 with the following information:

| Car | Make | Color | Documents |
| --- | --- | --- | --- |
| Car_1 | Toyota | Blue | Doc_1, Doc_2, Doc_3 |
| Car_2 | Honda | Red | Doc_4, Doc_5, Doc_6, Doc_7 |
| Car_3 | Toyota | Blue | Doc_8, Doc_9, Doc_10, Doc_11 |
| Car_4 | Honda | Blue | Doc_12, Doc_13, Doc_14, Doc_15 |
| Car_5 | Toyota | Red | Doc_16, Doc_17, Doc_18, Doc_19 |
| . | | | |
| . | | | |
| . | | | |
| Car_N | Make_N | Color_N | Doc_X, Doc_Y, Doc_Z |

As shown, the inverted index includes information on a group of cars: Car_1 through Car_N. For each car, the inverted index specifies its make, color, and a list of documents that include the specified make and color. The inverted index will typically include many more parameters (e.g., number of miles, model year, and the like); however, a simple example is provided so that the invention is not obscured by unnecessary detail. Naturally, the inverted index may include any type of information, the car information in this example is randomly selected.

As previously stated, the parametric index constructor 34 constructs the parametric index 36. The parametric index constructor 34 includes executable code to identify the following parameters: FieldEnums 38, Buckets 40, and BucketSets 42. These terms are defined as follows. Consider the case where there is one inverted index, C. These parameters can be defined in terms of C, where F is the set of fields in C, n is the number of elements in F, and m is the number of documents in C.

Given a field $f$ in F, then the values $f$ encapsulates are FieldEnums. A FieldEnum parameter 38 can be viewed as a quality instance, such as car make or car color. In this example, given a field "color", suppose that the inverted index includes FieldEnums of "color" specifying, blue, green, red, black, and white.

The parametric index constructor 34 also includes code to identify BucketSets 42. Consider a set $f_i$, where $f_i$ includes fields in F that are sets with elements of FieldEnum type of the same field. Such sorted sets are defined to be a BucketSet. There are n BucketSets in C. Relying upon the example above, the inverted index includes a BuckSet specifying the different manufacturers (e.g., Toyota, Honda, BMW, and Ford) and a BucketSet specifying the different car colors (e.g., blue, green, red, black, and white). The parametric index constructor 34 also includes code to identify individual Buckets 40. A bucket is any subset (continuous or disjoint) of a BucketSet.

Considering the sequence of all BucketSets $\{f_i\}$, the parametric index 36 can be defined as the product of all $f_i$, $1<i<n$. That is, the set of $F_0 \times f_1 \times \ldots \times f_1 \times \ldots \times f_n$. A parametric group can be defined as any subset of the parametric index. The parametric index can be viewed as a parametric group in itself. A parametric group can be viewed as a cross product of a set of buckets. Given a parametric group, say G, any element of G is of the form $a=(x_1, x_2, x_3, \ldots x_n)$. Such elements are also sets of the docIDs, e.g., $a=\{d_1, d_2, d_3 \ldots d_n\}$. A parametric result on G is the union of all elements of G over the set of docIDs.

Figure 3:
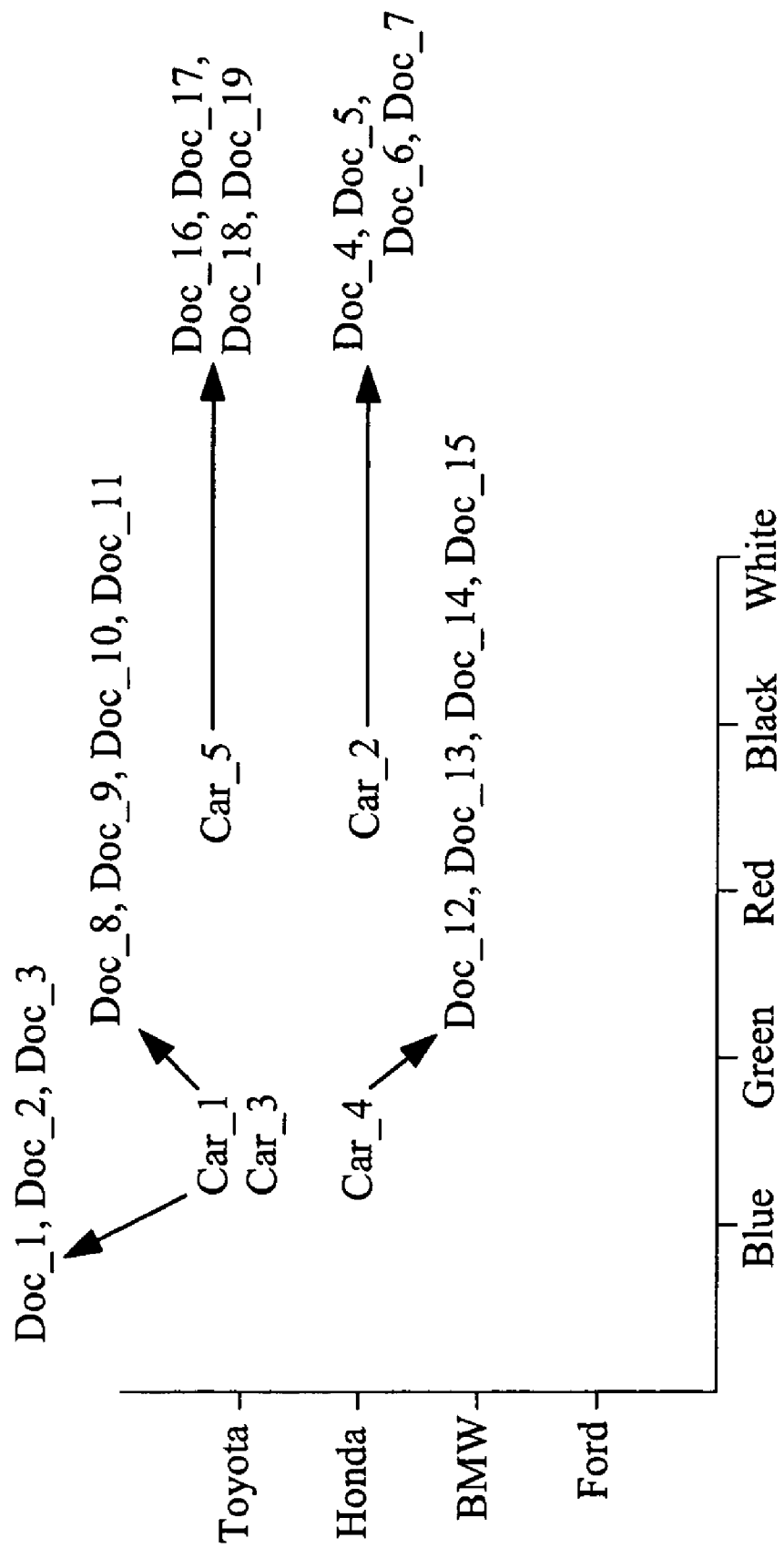
FIG. 3 illustrates an exemplary parametric index constructed in accordance with an embodiment of the invention.

FIG. 3 is an illustration of a parametric index 36 corresponding to the indexed database example provided above. The figure illustrates a vertical axis with a BucketSet of car manufacturers and a horizontal axis with a BucketSet of car colors. The intersections of the BucketSets define different Buckets. In this example, a bucket specifies a specific car. A specific car in a Bucket may include corresponding document identifications or pointers into the inverted index may be used to specify the corresponding document identifications. While the parametric index of FIG. 3 is a simple two-dimensional index, parametric indices with three or more dimensions may also be used in accordance with the invention.

Returning to FIG. 2, the next processing operation is to specify parametric groups (step 102). This operation may be performed by a parametric group harvester 50, which produces one or more parametric groups 52. The parametric groups may be specified in the form of a list presented at a graphical user interface. Alternately, the parametric groups may be derived from a parameter query or from a text query. Consider the example of a parameter query such as, "list every blue or red Toyota". Executable code of the parametric group harvester 50 identifies a list of buckets in this query that include, blue, red, and Toyota. The parametric group harvester 50 may also be delivered a list of buckets in the form of a bucket array. In either event, the parametric group harvester 50 produces a parametric group 52. This is accomplished using the processing steps illustrated in FIG. 4.

Figure 4:
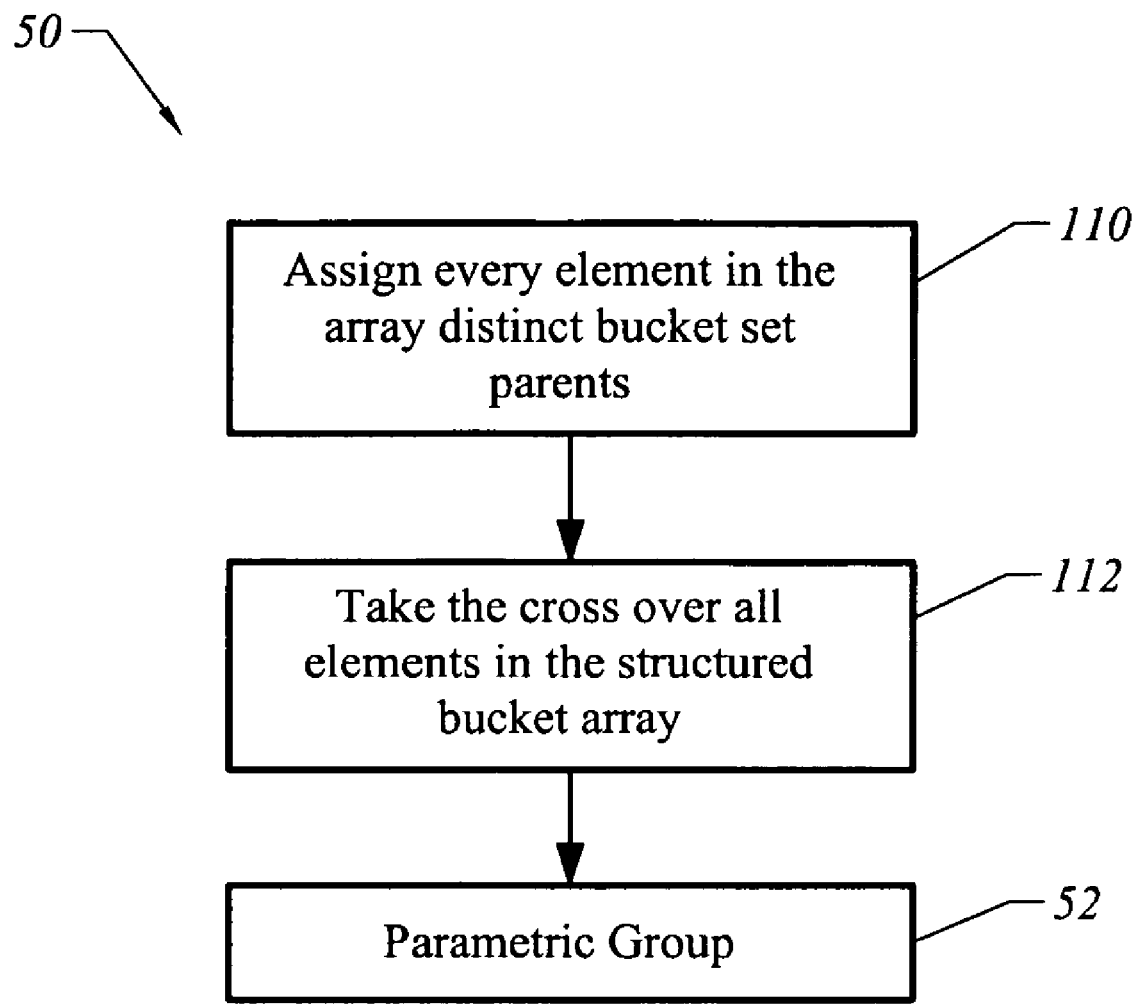
FIG. 4 illustrates processing steps performed by a parametric group harvester implemented in accordance with an embodiment of the invention.

FIG. 4 illustrates processing steps associated with an embodiment of the parametric group harvester 50. The first processing step shown in FIG. 4 is to assign every element in the array distinct bucket set parents (step 110). Relying upon the prior example, this produces: Bucket_1: Blue_Red and Bucket_2: Toyota. The next processing step shown in FIG. 4 is to take the cross (i.e., b1 X b2 X b3 . . . ) over all elements in the structured bucket array (step 112), which produce a parametric group 52. Relying upon the foregoing example, this produces the parametric group of {Car_1, Car_3, and Car_5}.

Figure 5:
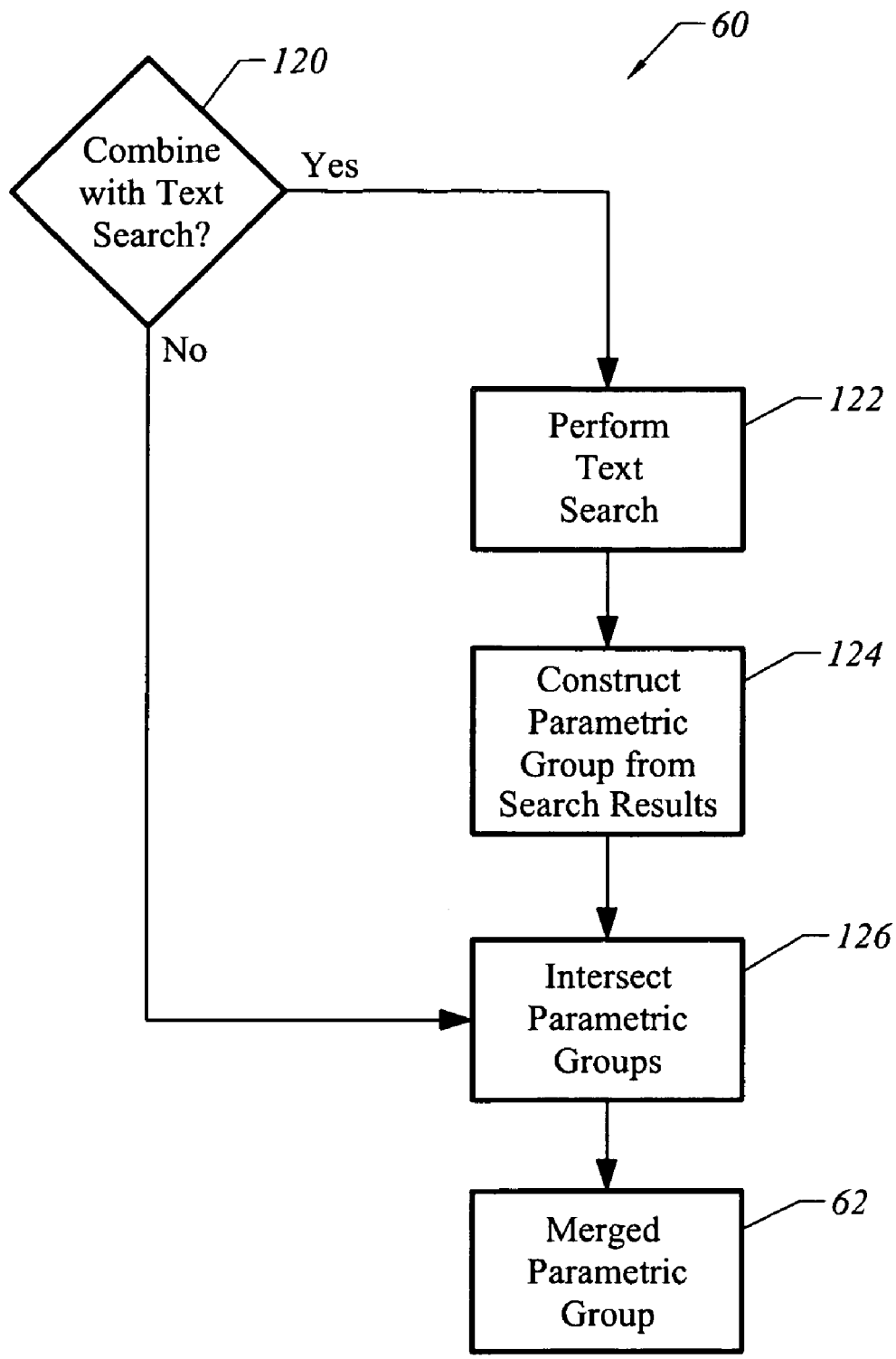
FIG. 5 illustrates processing steps performed by a parametric group combiner implemented in accordance with an embodiment of the invention.

Returning to FIG. 2, the next processing step is to merge parametric groups (step 104). This operation may be performed by a parametric group combiner 60. An embodiment of a parametric group combiner 60 is illustrated in FIG. 5.

The parametric group combiner 60 may be implemented to process two types of inputs. One type of input may be a list of parametric groups. Another type of input may be a parametric group and a query string. Thus, FIG. 5 illustrates an initial operation of determining whether to combine a parametric group with a query string or a text search (step 120). If the parametric group will not be combined with a query string, then previously identified parametric groups are merged (step 126) to produce a merged parametric group 62. For example, consider the following input parametric groups: {Car_1, Car_3, Car_5}, {Car_1, Car_3}, and {Car_1, Car_2, Car_3, Car_4}. The parametric groups may have been listed at a graphical interface and/or they may be the result of processing by the parametric group harvester 50. In any event, the intersection of the parametric groups in this example is {Car_1, Car_3}.

If a parametric group is to be combined with a text search, then the search is performed (step 122). The text search may be performed with a standard text search engine 74, which produces standard text search results 75. For example, consider the query "blue cars". This search retrieves the documents: {doc_1, doc_2, doc_3, doc_8, doc_9, doc_10, doc_11, doc_12, doc_13, doc_14, doc_15}.

A parametric group is then constructed from the search results (step 124). Relying upon the previous example, the documents from the text search correspond to a parametric group comprising: {Car_1, Car_3, Car_4}. That is, the documents from the text search can be mapped into the parametric index to form a parametric group. This parametric group produced from a query, referred to as a query parametric group, can then be intersected with another parametric group (step 126) to produce a merged parametric group 62. For example, the query parametric group {Car_1, Car_3, Car_4} can be intersected with the parametric group produced by the parametric group harvester 50 {Car_1, Car_3, Car_5} to produce a merged parametric group {Car_1, Car_3}.

Figure 6:
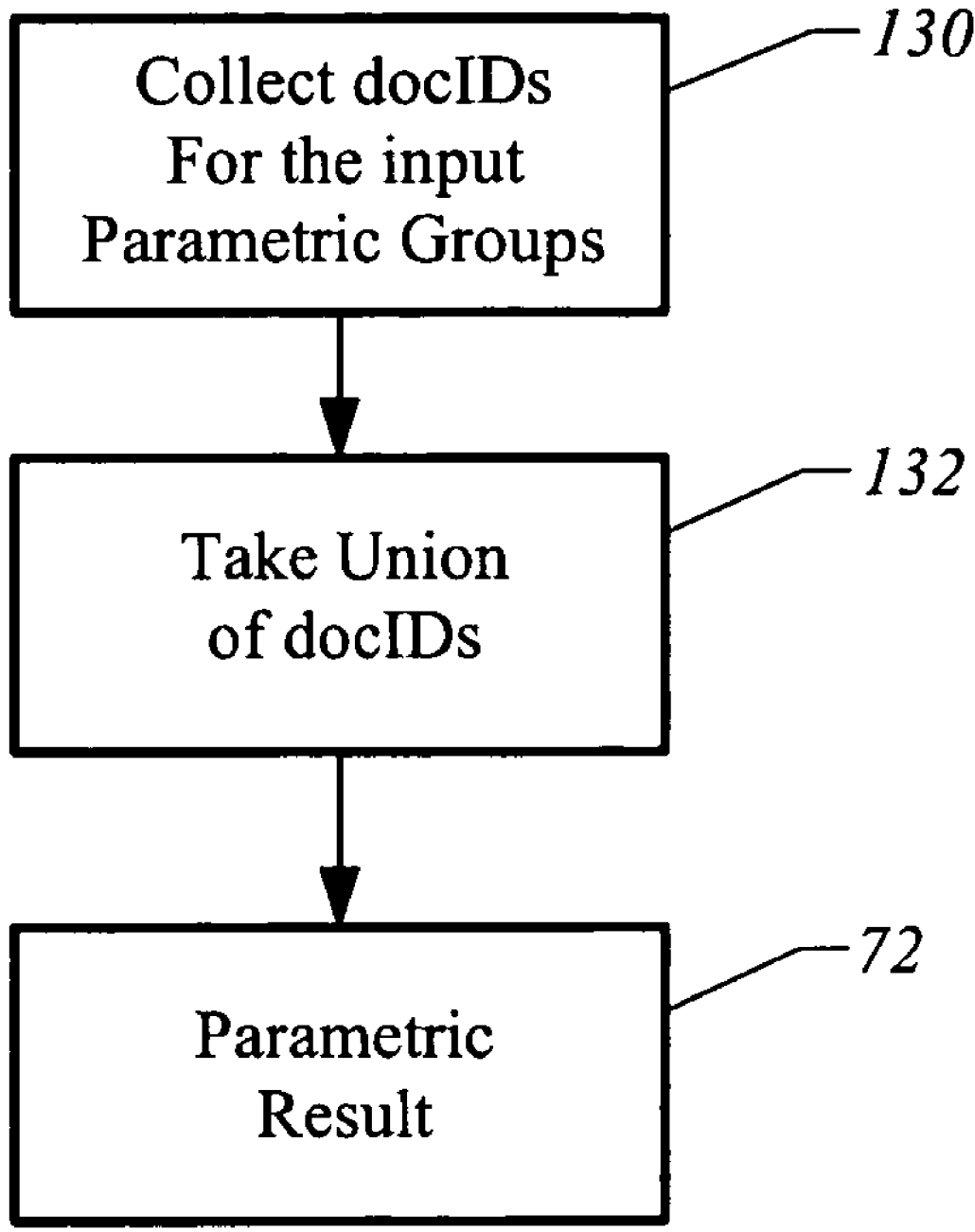
FIG. 6 illustrates processing steps performed by a parametric result generator implemented in accordance with an embodiment of the invention.

Returning to FIG. 1, the merged parametric group may then be processed by the parametric result generator 70 to produce a parametric result 72. FIG. 6 illustrates an embodiment of a parametric result generator 70. As shown, the first processing step may be to collect document identifications for the input parametric groups (step 130). The union of the document identifications is then taken (step 132) to produce a parametric result 72. Thus, for example, consider the merged parametric group {Car_1, Car_3}. The corresponding document identifications yielded by step 130 produces: {Doc_1, Doc_2, Doc_3} for Car_1 and {Doc_8, Doc_9, Doc_10, and Doc_11} for Car_3. The union of these document identifications at step 132 produces the parametric result of: {Doc_1, Doc_2, Doc_3, Doc_8, Doc_9, Doc_10, Doc_11}.

The invention's use of a parametric index 36 allows for a number of computational efficiencies. Parametric results are obtained without relatively time consuming conversions to SQL and subsequent database accesses. Instead, since the parametric index is relatively small, it can be stored and processed in primary memory, resulting in swift results. In addition, the parametric index 36 allows the results of text searches to be transformed into parametric groups. Consequently, the results of text searches may be used in parametric searching.

Once the parametric index 36 is constructed, a number of additional operations may be performed upon its contents. By way of example, the following functions may be implemented:

Intersect(Input: Bucket b1, Bucket b2; Output: Intersected Bucket), which returns the intersection of the two input buckets;

Union(Input: Bucket b1, Bucket b2; Output: Union Bucket), which returns the union of the two input buckets; and BucketSetBelongsTo( ), which returns the BucketSet parents B.

A number of operations may also be performed upon a parametric group. By way of example, the following functions may be implemented:

IsElementOf(element x), which returns true if G contains x, false if not;

Intersect(bucketSet BS, Bucket B), given B whose parent BucketSet is BS, this operation removes all elements in G whose values in BS dimension are not in B;

Cosntruct(DocID[ ]), which checks each identification's field to produce an appropriate mapping.

These functions are provided as examples. Naturally, many other functions may be defined to further exploit the operations and advantages of the invention.

The foregoing description, for purposes of explanation, used specific nomenclature to provide a through understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, the thereby enable other skilled in the art to best utilize the invention and various embodiments with various modifications as are suited to the particular use contemplated. It is intended that the scope of the invention be defined by the following claims and their equivalents.

The invention claimed is:

1. A computer readable medium for storing executable instructions processed by a central processing unit, the computer readable medium comprising executable instructions to:

form a parametric index that includes an arrangement of categorical attributes, each of said categorical attributes referencing any number of elements;

specify a first parametric group corresponding to a first subset of elements in said parametric index;

specify a second parametric group corresponding to a second subset of elements in said parametric index;

merge said first subset of elements of said first parametric group and said second subset of elements of said second parametric group to produce a merged parametric group; and extract a parametric result from said merged parametric group, wherein said parametric result identifies a set of documents without implementing parametric queries in a structured query language.

2. The computer readable medium of claim 1 further comprising executable instructions to store said parametric index in a primary memory local to the central processing unit.

3. The computer readable medium of claim 1 wherein said executable instructions to merge further comprises executable instructions to perform a logical operation that is independent of a query language.

4. The computer readable medium of claim 1 wherein said executable instructions to specify said first parametric group and said second parametric group comprise executable instructions to derive a parametric group from text search results.

5. The computer readable medium of claim 4 wherein said executable instructions to derive said parametric group comprise executable instructions to map said text search results into said parametric index to identify said parametric group for subsequent parametric group processing to identify other documents.

6. The computer readable medium of claim 1 wherein said executable instructions to at least specify said first parametric group comprise assigning every element in a bucket array to distinct bucket set parents to produce a structured bucket array.

7. The computer readable medium of claim 5 further comprising executable instructions to take the cross of all elements in said structured bucket array to produce a parametric group.

8. The computer readable medium of claim 1 wherein said executable instructions to merge comprise executable instructions to take the union of said first parametric group and said second parametric group to produce said merged parametric group.

9. The computer readable medium of claim 8 further comprising executable instructions to form the union of said document identifications to produce said parametric result.

10. The computer readable medium of claim 1 wherein said executable instructions To extract comprise executable instructions to collect document indentifications for said merged Parametric group.

11. A computer readable medium documents for storing executable instructions processed by a central processing unit, the computer readable medium comprising executable instructions to:

perform a text search to produce text search results including at least one categorical attribute;

map said text search results into a parametric index to identify a first subset of elements a first parametric group, said parametric index including categorical attributes arranged as fields of said parametric index with each of said categorical attributes referencing any number of elements;

merge said first subset of elements of said first parametric group with a second subset of elements corresponding to a second parametric group in said parametric index to produce a merged parametric group; and extract a parametric result from said merged parametric group, wherein said parametric result identifies a set of documents without implementing parametric queries in a structured query language.

12. The computer readable medium of claim 11 wherein said executable instructions to merge comprise executable instructions to take the union of said first parametric group and said second parametric group to produce said merged parametric group.

13. The computer readable medium of claim 11 wherein said executable instructions to extract comprise executable instructions to collect document identifications for said merged parametric group.

14. The computer readable medium of claim 13 further comprising executable instructions to form the union of said document identifications to produce said parametric result.

15. The computer readable medium of claim 11 wherein said executable instructions to merge further comprises executable instructions to perform a logical operation that is independent of a query language.

16. A computing device including a processor, a memory, and input/output devices, all of which are coupled by system bus, said computing device being configured to perform parametric processing to identify relevant document identifications in said memory, the computing device comprising:
   a parametric index configured to include an arrangement of categorical attributes, with a set of said categorical attributes referencing any number of elements;
   a parametric group harvester configured to specify a first parametric group corresponding to a first subset of elements in said parametric index and a specify a second parametric group corresponding to a second subset of elements in said parametric index;
   a parametric group combiner configured to merge said first subset of elements of said first parametric group and said second subset of elements of said second parametric group to produce a merged parametric group; and
   a parametric result generator configured to extract a parametric result from said merged parametric group,
   wherein said parametric result identifies a set of documents without implementing parametric queries in a structured query language.

17. The computing device of claim 16 wherein said memory is configured to implement at least said parametric index.

18. The computing device of claim 16 wherein said parametric group combiner is configured to perform a logical operation independent of a query language.

19. The computing device of claim 16 wherein said computing device is configured to identify said set of documents without accessing an external memory to extracting said parametric result from a database using a structure query language ("SQL").

* * * * *